(12) United States Patent
Chou et al.

(10) Patent No.: US 7,339,153 B2
(45) Date of Patent: Mar. 4, 2008

(54) PHOTON COUNTING METHODS AND DEVICES WITH ELECTRICAL PULSE DURATION AND INTENSITY MEASUREMENT

(75) Inventors: Dennis Y. Chou, Santa Fe Springs, CA (US); Winston Z. Ho, Hacienda Heights, CA (US)

(73) Assignee: Maxwell Sensors, Inc., Santa Fe Springs, CA (US)

( * ) Notice: Subject to any disclaimer, the term of this patent is extended or adjusted under 35 U.S.C. 154(b) by 49 days.

(21) Appl. No.: 11/340,138

(22) Filed: Jan. 26, 2006

(65) Prior Publication Data

US 2007/0170353 A1    Jul. 26, 2007

(51) Int. Cl.
*H01J 43/30* (2006.01)
(52) U.S. Cl. .............................. 250/214 VT; 250/207; 324/753
(58) Field of Classification Search ............ 250/214 R, 250/214.1, 214 VT, 207, 458.1
See application file for complete search history.

(56) References Cited

U.S. PATENT DOCUMENTS

| 5,401,951 | A |   | 3/1995 | Butler |
| 6,342,701 | B1 |   | 1/2002 | Kash |
| 6,596,980 | B2 |   | 7/2003 | Rusu |
| 6,654,119 | B1 | * | 11/2003 | Gould et al. ................. 356/318 |
| 6,760,105 | B2 | * | 7/2004 | Oshida et al. ............... 356/317 |
| 6,992,761 | B2 | * | 1/2006 | Modlin et al. ............... 356/317 |

* cited by examiner

*Primary Examiner*—Que Tan Le
*Assistant Examiner*—Stephen Yam
(74) *Attorney, Agent, or Firm*—Liu & Liu

(57) ABSTRACT

Photon counting electronics and method that allow for counting single photons with sensitivity, linearity, and accuracy. The method for accurately counting photon numbers entering a photon multiplier tube comprising the steps of counting the number of the electrical pulses generated by photons; measuring the duration of the electrical pulses with a timing clock, wherein the timing clock can count the number of temporally overlapped photons; measuring the intensity of the electrical pulses with an intensity discriminator, wherein the intensity discriminator can count the number of intensity-overlapped photons; and summing the number of the electrical pulses, the number of temporally overlapped photon, and the number of intensity-overlapped photons, that is equal to the total number of photons.

20 Claims, 3 Drawing Sheets

PHOTON COUNTING METHODS AND DEVICES WITH ELECTRICAL PULSE DURATION AND INTENSITY MEASUREMENT

FIELD OF THE INVENTION

The invention is related to photon counting electronics and methods that allow for counting single photons with sensitivity, linearity, and accuracy. The invention includes apparatus and methods for using a timing counter and intensity discriminator for measuring the overlapped pulses, thus improving the ability to count the photon accurately. The method of photoncounting can be implemented in a variety of optical devices, such as luminometers or fluorescence analyzers, for photon detection.

BACKGROUND OF THE INVENTION

Luminescence method has been used as an optical method to quantify the number of analyte or molecules. Luminescence reactions including light-emitting chemical reactions (chemiluminescence, CL), light-emitting biological reactions (bioluminescence, BL), and electro-induced luminescence have a diverse range of analytical and biological applications. Advantages of luminescence assays include very high sensitivity due to the current technology in photon counting and enzyme amplification, rapid signal generated in a few seconds, and assays do not need an external excitation light source. In many situations, these procedures are replacing the use of radioactive nuclides. As luminescent agents become more efficient, many more studies are making use of luminescence assays as analytical tools. Chemiluminescent substrates, such as dioxetane, luminol, acridinium ester and hydrazide, have been developed. These compounds are catalyzed by hydrolytic enzymes and the resulting products emit light. Bioluminescent reactions are generally more efficient than chemiluminescence. BL has traditionally been associated with firefly luciferase. AquaLite (SeaLite Sciences, Georgia) is a recombinant form of a photoprotein from jellyfish. It can be triggered to produce all of its light in a single step within a few seconds. CL and BL methods have been developed for many enzyme labels (alkaline phosphatase, galactosidase, horseradish peroxidase, etc.). The enzymes are conjugated to the secondary antibody or analyte for subsequent substrate reactions.

In a typical sandwich immunoassay, the analyte is sandwiched between the antibody conjugate and immobilized probes. The luminescence intensity at any time is a direct measure of the concentration of enzyme conjugate or analyte for positive identification. The newly developed dioxetane offers a detection sensitivity of 600 molecules ($10^{-21}$ mole), making it several orders more sensitive than the fluorescence-based assay. Rather than a luminescent species being directly attached to a target analyte or to its binding partner, an enzyme is used to catalyze a luminescent reaction. The catalytic turnover ability of the enzyme allows thousands of potentially luminescent reactions to occur per second as long as sufficient substrate is present. Less than $10^{-21}$ mole of alkaline phosphatase can be detected in solutions using dioxetane-based compounds, such as Lumi-PPD and Lumi-PS-1 of Lumigen Inc. (Southfield, Mich.). When Lumi-PPD is added to a microwell containing alkaline phosphatase, the resulting chemiluminescence reaches a maximum after 5-10 minutes and remains constant for more than an hour. Various luminescence detection devices (for example, a luminometer) are commercially available.

As technology advances, it becomes necessary to detect very small amount of analyte in femtomole, attomole, zetomole, or single molecule quantity. For high sensitivity optical detection, photon multiplier tube (PMT) is the most widely used detector. The PMT has been operated in two different modes: photocurrent and photoncounting. The photocurrent mode is designed to detect high light signal with abundance of optical photons. If the input photons are continuously coming into a PMT, it will be a photocurrent application. However, if the number of input photons is low, for example, each photo is coming into PMT apart from each other, the photocurrent measurement will fail. It is because that there is no analog to digital converter (ADC) which can perform conversion fast enough to be able to measure the photocurrent produced by one photon.

The number of photons being generated in the reaction is directly proportional to the analyte quantity. Optical detection with photoncounting capability becomes critical for the studies of events that occur with a very small amount of analyte. Photoncounting is one of the best methods to detect molecular events. The existing photoncounting system is based on the combination of a PMT and a photoncounting circuitry. Photoncounting PMT has the ability to count photons and detect a single photon event, such as photons generated from luminescence or single molecular fluorescence. While the photoncounting PMT has the sensitivity to detect every single photon and count the number of photons, it has drawbacks of optical nonlinearity and inaccuracy. The photons reaching the detector have not been counted correctly. Typically, a PMT outputs an electrical pulse in correspondence to the entering photon. One photon generates one pulse. However, when the input light signal is slightly increased, the photons may overlap and cause the electrical pulse to overlap accordingly. The overlapped pulses become a long pulse, rather than individual short pulses. Since photoncounting circuitry measures light intensity by counting the number of the electrical pulses, the long pulse will be considered as one pulse. In this situation, the photoncounting system is not able to count the photons accurately and the optical nonlinearity would occur.

U.S. Pat. No. 5,401,951 to Butler et al., entire contents of which are incorporated herein by reference, discloses an method and apparatus for overload protection for a photomultiplier tube. A light source illuminates a photomultiplier tube which produces a signal proportional to the incoming radiation which is sent to photon counting electronics. The photon counting electronics produces a signal in proportion to the input photons to the photomultiplier tube and also provides an output to a frequency to voltage converter. The frequency to voltage converter is used to modulate a high voltage amplifier which controls the output of the photomultiplier tube. When the photon counting electronics indicate to the frequency to voltage converter that the photons produced by the photomultiplier tube exceed a predetermined maximum the high voltage amplifier reduces the gain of the photomultiplier tube.

U.S. Pat. No. 6,596,980 to Rusu et al., entire contents of which are incorporated herein by reference, discloses a method and apparatus for overload protection for a photomultiplier tube. A method and apparatus to measure statistical variation of electrical signal phase in integrated circuits using time-correlated photon counting U.S. Pat. No. 6,342,701 to Kash et al., entire contents of which are incorporated herein by reference, discloses a system for time-correlated photon counting. The system uses one or more photon detectors to produce electrical pulses corresponding to photons read from a target. The system uses a discriminator with a first input coupled to a trigger output from a pulsed optical source and a second input for receiving the electrical pulses.

None of the above-identified patents discloses a method to count the number of single photons. The invention includes apparatus and methods to accurately count the individual photons using a timing counter and intensity discriminator for measuring the overlapped pulses.

SUMMARY OF THE INVENTION

One object of the invention is to integrate a timing clock counter into the photoncounting circuitry to improve the accuracy of photon counting by correctly counting the temporally overlapped photons.

One object of the invention is to integrate an intensity discriminator into the photoncounting circuitry to improve the accuracy of photon counting by correctly counting the intensity-overlapped photons.

One object of the invention is to integrate a timing clock counter and an intensity discriminator into the photoncounting circuitry to improve the accuracy of photon counting.

It is an object of the present invention to improve the photon counting accuracy and optical linearity for measurement of photons generated from a luminescence reaction.

It is an object of the present invention to incorporate additional timing clock and intensity discriminating counters into a PMT circuitry for single photon detection.

The present invention has the advantage of sensitivity and accuracy for detecting single photon intensity for a variety of applications. It should be understood, however, that the detailed description and specific examples, while indicating preferred embodiments of the present invention, are given by way of illustration and not of limitation. Further, as is will become apparent to those skilled in the area, the teaching of the present invention can be applied to devices for measuring the concentration of a variety of samples.

Some aspects of the invention relate to a method for accurately counting photon numbers entering a photon multiplier tube comprising the steps of (a) counting a number of electrical pulses generated by photons; (b) measuring a duration of the electrical pulses with a timing clock, wherein the timing clock counts a number of temporally overlapped photons; and (c) summing the number of the electrical pulses in (a) and the number of temporally overlapped photons in (b), wherein the sum represents a total number of photons.

Some aspects of the invention relate to a method for accurately counting photon numbers entering a photon multiplier tube comprising the steps of (a) counting a number of electrical pulses generated by photons; (b) measuring a duration of the electrical pulses with a timing clock, wherein the timing clock counts a number of temporally overlapped photons; (c) measuring an intensity of the electrical pulses with an intensity discriminator, wherein the intensity discriminator counts a number of intensity-overlapped photons; and (d) summing the number of the electrical pulses in (a), the number of temporally overlapped photons in (b), and the number of intensity-overlapped photons in (c), whereas the sum represents a total number of photons.

BRIEF DESCRIPTION OF THE DRAWINGS

Additional objects and features of the present invention will become more apparent and the invention itself will be best understood from the following Detailed Description of Exemplary Embodiments, when read with reference to the accompanying drawings.

DETAILED DESCRIPTION OF EXEMPLARY EMBODIMENTS

Additional objects and features of the present invention will become more apparent and the invention itself will be best understood from the following Detailed Description of exemplary embodiments of the inventions.

The photomultiplier tube provides extremely high sensitivity and ultra-fast response. Photomultiplier tubes have high bandwidth and noise-free gain on the order of a million. This makes them ideal for the detection of extremely low light or short pulses of light. Photomultipliers can be used to detect photons with a wavelength from 115 nm to 1700 nm. A typical photomultiplier consists of a photoemissive cathode (photocathode) followed by an electron multiplier and an electron collector (anode). The PMT used for photon-counting are pre-selected tubes with very low dark current. When the PMT is integrated with photon counting circuitry for single photon detection, it becomes a very sensitive optical device. In one embodiment, the photomultiplier tube of the present invention detects photons with a wavelength from 115 nm to 1700 nm, preferably a wavelength between 500 to 1000 nm.

Figure 1:
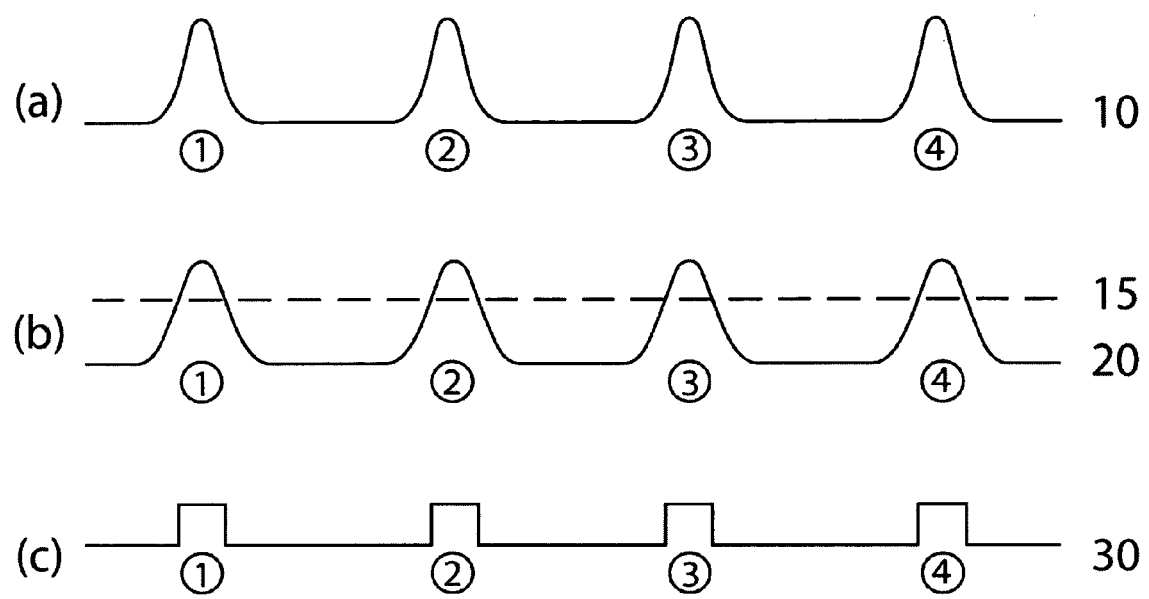
FIG. 1 shows the temporal profile of (a) a photon pulse, (b) an electronic pulse, and (c) a digital counting pulse in a situation with no overlapped pulses.

The conventional single photon counting circuitry is designed to detect a series of single photons with no overlapping. For example, FIG. 1 shows the temporal profile of (a) a photon pulse 10, (b) an electronic pulse 20, and (c) a digital counting pulse 30 measured by a counter. The figure shows three photons, 1, 2 and 3, entering into the detector in sequence, and in response with three individual electrical pulses. When the electrical pulse intensity exceeds a certain intensity threshold 15, it is counted digitally as one photon. Therefore, the three electrical pulses 1, 2, and 3 are counted as three photons. In this case, the system counts the photons accurately and linearly.

Figure 2:
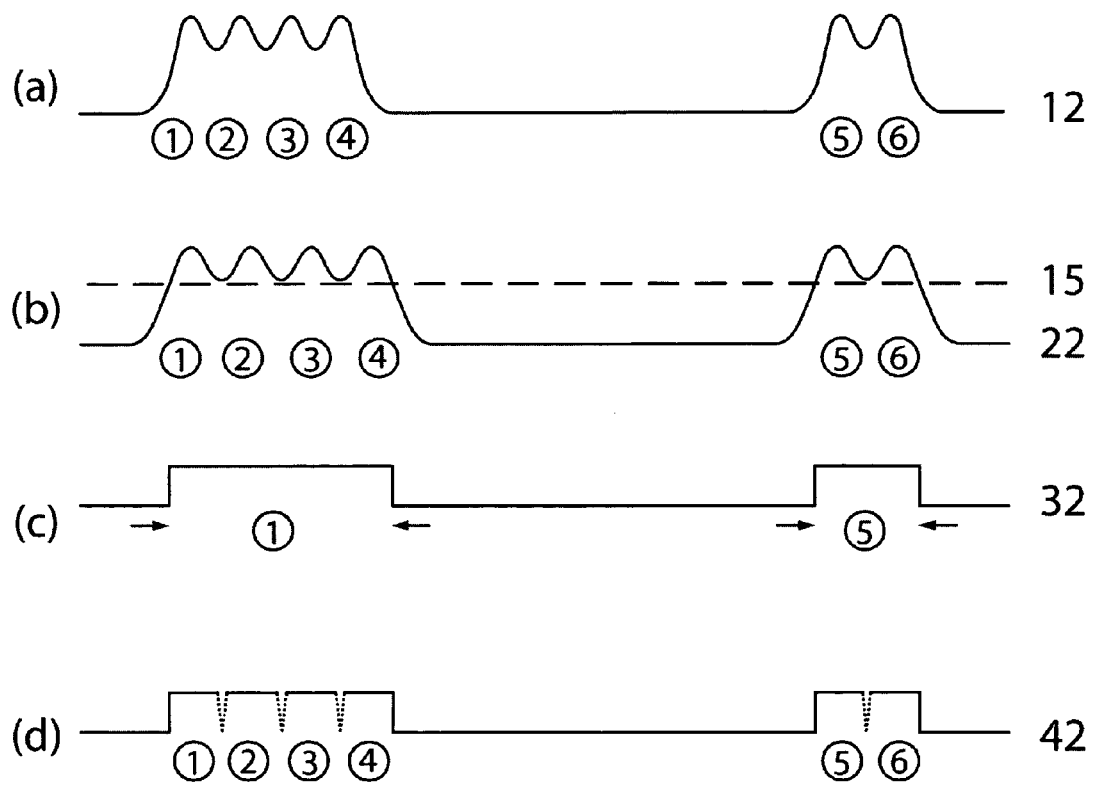
FIG. 2 shows the temporal profile of (a) a photon pulse, (b) an electronic pulse, (c) a regular digital counting pulse, and (d) a new digital counting pulse with an additional timing clock, wherein the duration of the electrical pulse is used to calculate the number of temporally overlapped photons.

The time duration between each incoming photon is a function of random variable. When the optical signal is increased slightly, the photons entering into the detector may overlap. FIG. 2 shows the temporal profile of (a) a photon pulse 12, (b) an electronic pulse 22, (c) a regular digital counting pulse 32, and (d) a new digital counting pulse 42 with additional timing clock. When the pulses are too close, the plural pulse temporal profiles start to overlap. For example in FIG. 2, there are six photons, 1, 2, 3, 4, 5, and 6, entering into the detector, but they are counted as two photons, 1 and 5, with conventional photoncounting systems. This is because the counter treats a pulse, long or short, as a single pulse. This invention corrects the problem by introducing additional timing clocks to measure the duration of the digital counting pulses 42. Because a single photon pulse duration is known, it is possible to measure how many overlapped photons appeared in a long electrical pulse. By adding a timing clock counter, it can measure the number of temporally overlapped photons with a sum of time period of the pulses. With this addition, the correct number of photons would appear as shown in FIG. 2-(d). In one embodiment, the time clock has a time resolution of less than 100 ns, preferably less than about 10 ns, most preferably less than about 1 ns.

Figure 3:
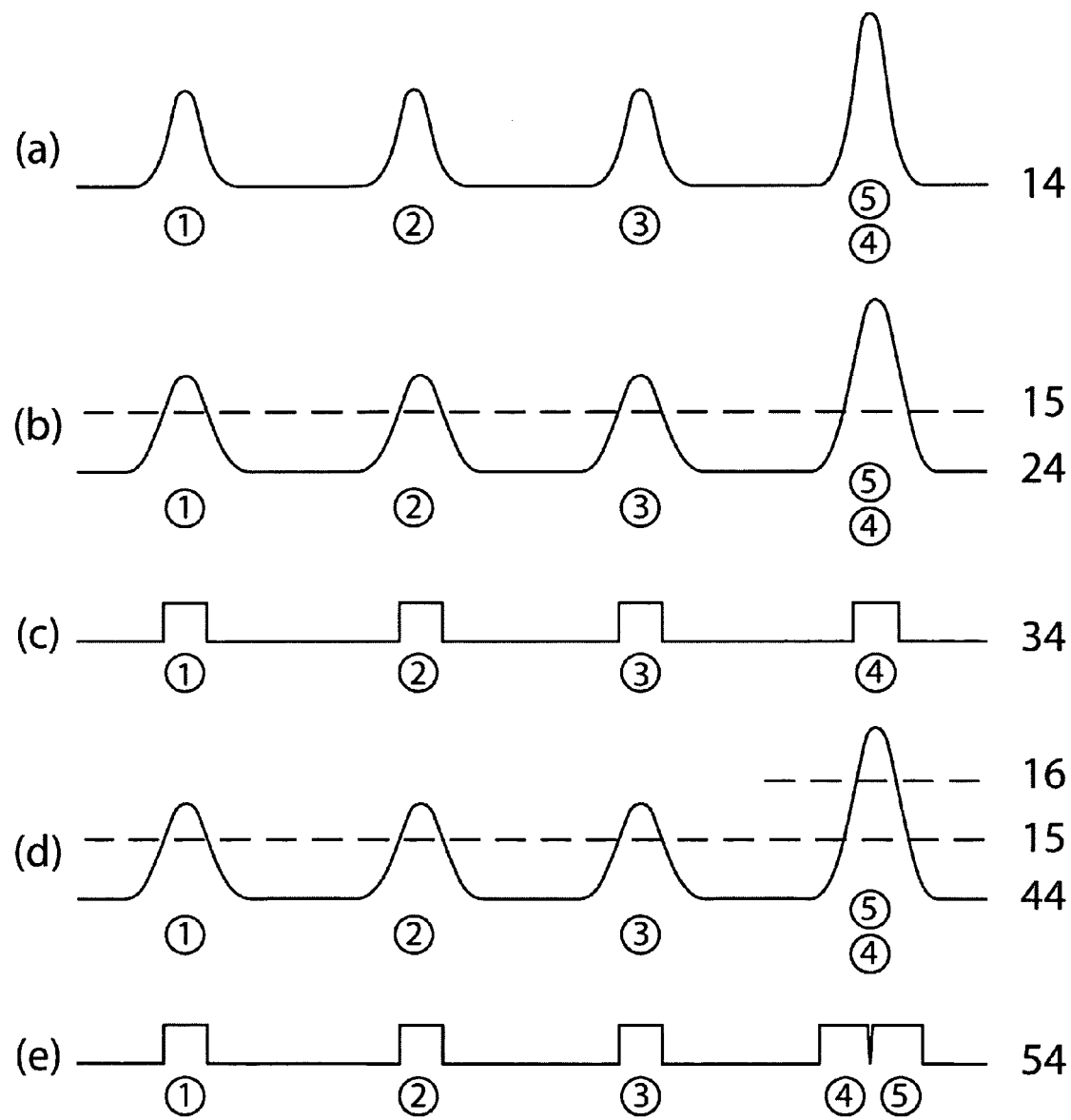
FIG. 3 shows the temporal profile of (a) a photon pulse, (b) an electronic pulse, (c) a regular digital counting pulse, (d) an additional intensity discriminator, and (e) a new digital counting pulse with an additional intensity discriminator, wherein the intensity of the pulse is used to calculate the number of intensity overlapped photons.

As the optical signal increases, some photons may enter the detector simultaneously or exactly the same time. The above-mentioned timing clock still cannot address the situation of two photons reaching the detector at the same time. FIG. 3 shows the temporal profile of (a) a photon pulse 14, (b) an electronic pulse 24, (c) a regular digital counting pulse 34, (d) an additional intensity discriminator 44, and (e) a new digital counting pulse 54 with an additional intensity discriminator. The photon numbers 1 and 2 do not have any problem, but the photon numbers 3 and 4, generate a strong electrical pulse and is counted as a single photon. This is because all conventional circuitry only has one intensity discrimination level. This invention introduces additional intensity discriminators with multiple levels or thresholds, 15, and 16, as shown in FIG. 3-(d) for counting the intensity-overlapped photons. Therefore, it can calculate the number of the overlapped photons based on its intensity level. With multiple intensity discriminators, the exact intensity-overlapped photons, 3 and 4, can be measured accurately as shown in FIG. 3-(e). The intensity discriminating counter will measure the high intensity pulses and count the correct photon numbers. The total number of photons is calculated by a software program or a computer software program. The programmable or reconfigurable photoncounting circuitry with these new counters would significantly improve the sensitivity and reliability of single photon detection.

Some aspects of the invention provide a method for accurately counting photon numbers entering a photon multiplier tube comprising the steps of: (a) counting a number of electrical pulses generated by photons; (b) measuring a duration of the electrical pulses with a timing clock, wherein the timing clock counts a number of temporally overlapped photons; (c) measuring an intensity of the electrical pulses with an intensity discriminator, wherein the intensity discriminator counts a number of intensity-overlapped photons; and summing the number of the electrical pulses in the counting step (a), the number of temporally overlapped photons in the measuring step (b), and the number of intensity-overlapped photons in the measuring step (c). The sum represents a total number of photons. In one embodiment, the total number of photons is used for quantifying the number of photons generated from a luminescence reaction, wherein the luminescence reaction is selected from the group consisting of chemiluminescence, bioluminescence, and electroluminescence reaction.

From the foregoing, it should now be appreciated that a photoncounting circuitry comprising at least one timing clock counter and one intensity discriminator for measuring the number of photons linearly and accurately. Although the example of the photoncounting device and method is illustrated for detecting the luminescence signal, it is also generally applicable for monitoring optical signal from other instruments, such as spectrometers, sensors, and many other medical and non-medical devices. While the invention has been described with reference to a specific embodiment, the description is illustrative of the invention and is not to be construed as limiting the invention. Various modifications and applications may occur to those skilled in the art without departing from the true spirit and scope of the invention as described by the appended claims.

The claim of the invention is:

1. A method for counting number of discrete photons detected by a photomultiplier tube, comprising the steps of: determining number of electrical pulses corresponding to photons entering the photomultiplier tube, wherein at least one of the electrical pulses comprising a number of overlapping pulses corresponding to two or more discrete photons present in a close temporal space; determining number of overlapping pulses present within each electrical pulse; and determining total number of discrete photons detected based on the number of electrical pulses and number of overlapping pulses if present within the electrical pulses.

2. The method as defined in claim 1, wherein the step of determining number of overlapping pulses comprises at least one of the steps of determining duration of each electrical pulse and determining intensity level of each electrical pulse, to determine presence of overlapping pulses.

3. The method as defined in claim 2, wherein the step of determining number of overlapping pulses comprises both determining duration of each electrical pulse and determining multiple intensity level of each electrical pulse, to determine presence of overlapping pulses.

4. The method as defined in claim 2, wherein the step of determining duration of each electrical pulse comprises measuring the duration of each electrical pulse with a timing clock, wherein the duration provides an indication of presence of wider pulse width corresponding to presence of overlapping pulses within each electrical pulse and number of such overlapping pulses within each electrical pulse.

5. The method as defined in claim 4, wherein the timing clock counts a number of overlapping pulses, if present within each electrical pulse, which corresponds to a number of discrete photons.

6. The method as defined in claim 5, wherein said time clock has a time resolution of less than 100 ns.

7. The method as defined in claim 5, wherein said time clock has a time resolution of less than 10 ns.

8. The method as defined in claim 5, wherein said time clock has a time resolution of less than 1 ns.

9. The method as defined in claim 1, wherein said photon multiplier tube detects photons with a wavelength from 115 nm to 1700 nm.

10. The method as defined in claim 9, wherein said photon multiplier tube detects photons with a wavelength from 500 nm to 1000 nm.

11. The method as defined in claim 1, wherein said total number of photons is calculated by a software program.

12. The method as defined in claim 1, wherein the total number of photons detected is used for quantifying the number of photons generated from a luminescence reaction.

13. The method as defined in claim 12, wherein said luminescence reaction is selected from the group consisting of chemiluminescence, bioluminescence, and electroluminescence reaction.

14. The method as defined in claim 2, wherein the step of determining intensity level of each electrical pulse comprises determining presence of multiple levels within each electrical pulse corresponding to overlapping pulses.

15. The method as defined in claim 14, wherein the step of determining intensity level of each electrical pulse comprises measuring the intensity level of each electrical pulse with an intensity discriminator.

16. The method as defined in claim 15, wherein said intensity discriminator comprises a discriminating circuitry to determine presence of multiple levels within each electrical pulse.

17. The method as defined in claim 14, wherein the intensity discriminator counts number of multiple levels corresponding to number of overlapping pulses, if present within each electrical pulse, which corresponds to a number of discrete photons.

18. The method as defined in claim 3, wherein the step of determining intensity level of each electrical pulse comprises determining presence of multiple levels within each electrical pulse corresponding to overlapping pulses.

19. The method as defined in claim 14, wherein the step of determining intensity level of each electrical pulse comprises measuring the intensity level of each electrical pulse with an intensity discriminator.

20. The method as defined in claim 1, wherein the step of determining number of overlapping pulses comprises determining intensity level of each electrical pulse to determine presence of multiple levels within each electrical pulse corresponding to overlapping pulses, and counting number of overlapping pulses, if present within each electrical pulse, which corresponds to a number of discrete photons.

* * * * *